United States Patent [19]

Akamatsu

[11] Patent Number: 4,768,153

[45] Date of Patent: Aug. 30, 1988

[54] AUTOMATIC PILOT SYSTEM

[75] Inventor: Akio Akamatsu, Ashiya, Japan

[73] Assignee: Furuno Electric Company, Limited, Nishinomiya, Japan

[21] Appl. No.: 765,997

[22] Filed: Aug. 15, 1985

[30] Foreign Application Priority Data

Aug. 30, 1984 [JP] Japan ................................. 59-181529

[51] Int. Cl.$^4$ ........................................... B63H 25/04
[52] U.S. Cl. .................................... 364/449; 364/457; 364/452; 364/444; 318/588
[58] Field of Search ............... 364/443, 444, 451, 452, 364/449, 460, 457; 73/178 R; 318/588

[56] References Cited

U.S. PATENT DOCUMENTS

| | | |
|---|---|---|
| 3,683,378 | 8/1972 | Polhemus ........................ 364/457 X |
| 4,040,374 | 8/1977 | Greene ................................. 318/588 |
| 4,074,648 | 2/1978 | Reid et al. ........................... 318/588 |
| 4,253,149 | 2/1981 | Cunningham et al. ......... 318/588 X |
| 4,336,594 | 6/1982 | Masuzawa et al. ............. 318/588 X |
| 4,590,569 | 5/1986 | Rogoff et al. ........................ 364/452 |

Primary Examiner—Parshotam S. Lall
Assistant Examiner—Thomas G. Black
Attorney, Agent, or Firm—Jordan and Hamburg

[57] ABSTRACT

The present invention relates to an automobile pilot system employing an electronic navigation receiver such as a Loran C receiver and an azimuth detector such as a magnetic compass. The automatic pilot system is capable of coping with undesirable forces to move a moving body laterally due to current flows and the wind, thereby directing the moving body to a destination point preset.

12 Claims, 3 Drawing Sheets

AUTOMATIC PILOT SYSTEM

BACKGROUND OF THE INVENTION

The invention relates to an automatic pilot system for automatically directing a moving body such as a ship or an airplane to a predetermined destination point based on the output signals both from an electronic navigation receiver and an azimuth detector.

An electronic navigation receiver comprises, for example, a Loran C receiver or an Omega receiver. An azimuth detector comprises, for example, a magnetic compass or a gyrocompass. The electronic navigation receiver provides information representing successive positions of a moving body. The azimuth detector provides a signal representative of a specific direction of the moving body, for example, a heading direction thereof.

Hereinafter, the invention will be explained as embodied in an automatic pilot system installed on a ship.

In order to steer a ship along a desired course, an automatic pilot system including a bearing measuring apparatus such as a gyrocompass or a magnetic compass has been generally used. With a prior art automatic pilot system employing even a high-precision bearing detector as a gyrocompass, there are often cases in which the ship is laterally moved by forces due to current flows and winds, so that the ship advances along a course different from and parallel with a predetermined intended course and hence it is not capable of reaching a destination point. Another prior art automatic pilot system utilizing a magnetic compass has such a drawback that it requires troublesome magnetic deviation adjustments when it is installed on a ship.

SUMMARY OF THE INVENTION

Accordingly, an object of the invention is to provide an automatic pilot system for directing a moving body to a predetermined destination point efficiently and economically.

Another object of the invention is to provide an automatic pilot system for controlling a moving body to reach a destination point based on the output signals both from an electronic navigation receiver and an azimuth detector.

According to one aspect of the invention, the automatic pilot system comprises (i) first means for providing a signal representative of a destination point, (ii) second means for determining a course line joining the present position of the moving body and the destination point and for producing a signal representative of the course line, (iii) third means for producing a signal representative of a specific direction of the moving body, (iv) fourth means for producing a signal representative of a difference angle of intersection formed by an azimuth line determined based on signals representative of a plurality of the positions of the moving body, and an azimuth line determined based on the signals representative of a plurality of the positions of the moving body and the signals from said third means representative of the azimuth at the plurality of the positions of the moving body, (v) fifth means for adding the output signal from said fourth means to the output signal from said third means representative of the specific direction of the moving body at its present position, (vi) sixth means for producing a difference signal between the output signal from said second means representative of the course line joining the present position of the moving body and a destination point and the output signal from said fifth means, and (vii) seventh means for steering the moving body based on the output signal from said sixth means.

DETAILED DESCRIPTION OF THE PREFERRED EMBODIMENTS

Figure 1:
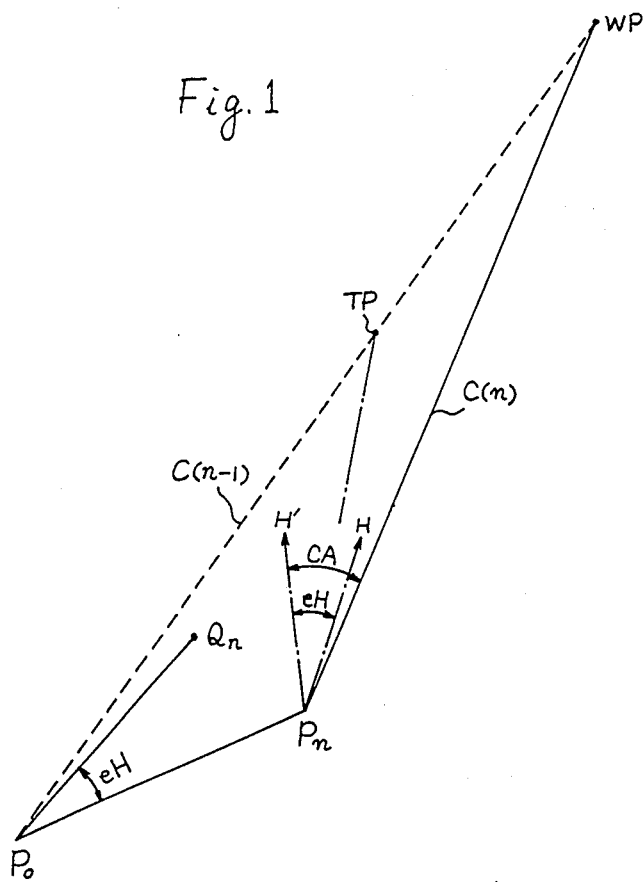
FIG. 1 shows a diagram for explaining the principle of the invention.

Referring to FIG. 1, it is first assumed that a ship is positioned and starts at a point Po, and its destination point is a point WP. A course line joining the two points Po and WP is determined. The ship is intended to proceed along the course line C(n−1). But, the ship is not capable of advancing along the course line C(n−1), when the ship is moved in a lateral direction due to azimuth errors produced by an azimuth detector such as a magnetic compass, or by forces due to current flows or winds. Assuming now that the ship has actually moved from the point Po to a point Pn due to the azimuth errors with the compass or the forces mentioned above. The positions of the ship at the points Po and Pn are measured by an electronic navigation receiver such as a Loran C receiver or an Omega receiver. When the ship reaches the point Pn, a deviation angle eH of intersection formed by a line joining the points Po and Pn and another line joining the point Po and a presumed point Qn, which will be explained in detail later, is determined. The heading direction of the ship should now be changed to lead the ship to the destination point WP. A new course line C(n) joining the point Pn and the destination point WP is computed at the point Pn. A specific direction of the ship, for example the heading direction thereof, is represented as H. The heading direction of the ship should be changed to a bearing H′ obtained by arithmetically adding the deviation angle eH to the heading direction H of the ship measured at the point Pn in order to cope with the effects due to the current flows and winds mentioned above, thereby leading the ship to the destination point WP. A compensation angle CA formed by the new course line C(n) and the changed heading direction H′ is obtained by subtracting the new course C(n) from the newly established heading direction H′. The compensated bearing H′ in which the ship will advance is repeatedly obtained every time the ship moves by a predetermined distance, for example, 1.5 miles. The signal representative of the compensation angle CA is supplied to a steering unit for steering the ship to the destination point WP.

Figure 2:
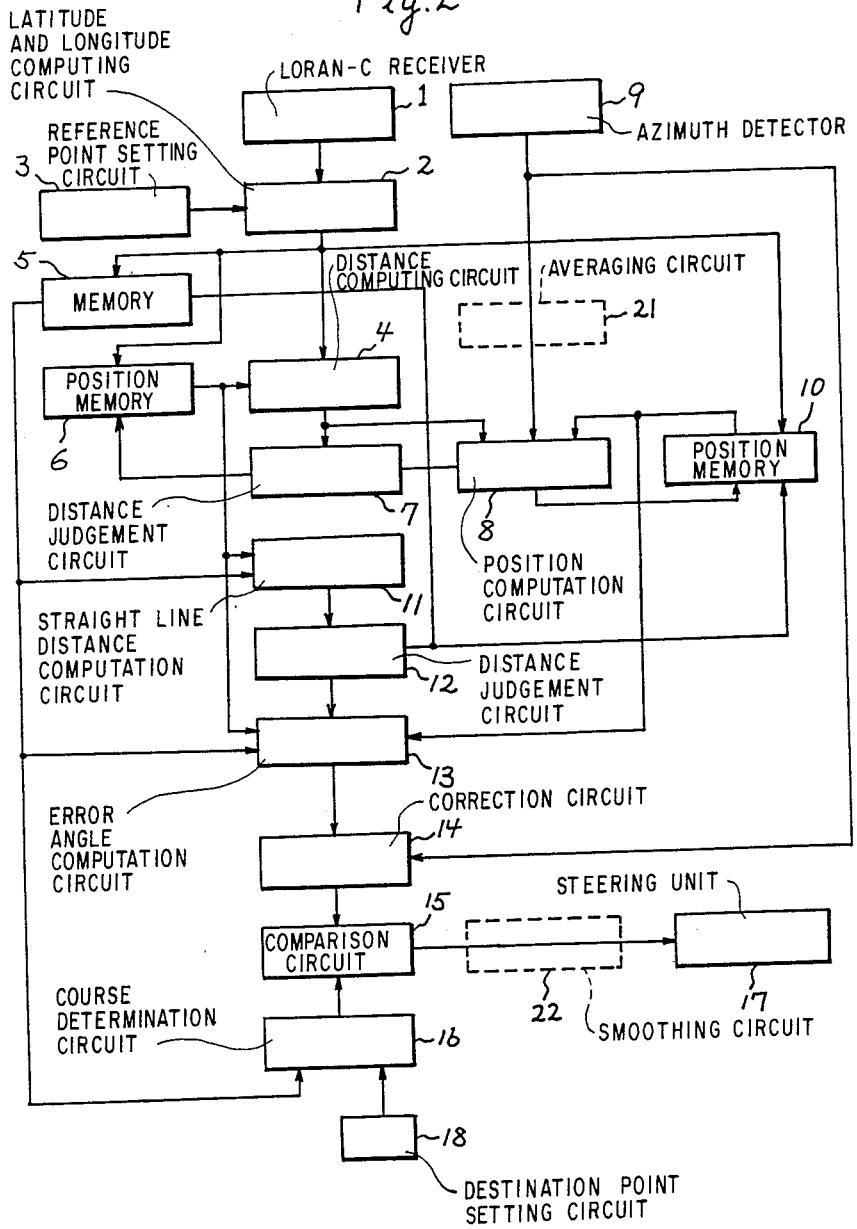
FIG. 2 shows a schematic block diagram of an automatic pilot system according to an embodiment of the invention.

Referring to FIG. 2, an electronic navigation receiver 1 comprising a Loran C receiver which receives navigation signals to measure successive positions of the ship and to produce signals representative of a position of the ship. The position signals produced by the Loran C receiver 1 correspond to a point on a Loran chart, and supplied to one input of a longitude and latitude computation circuit 2 which computes to produce signals representative of the longitude and latitude of the ship's position. A reference point setting circuit 3 stores and produces signals representative of the longitude and latitude preset therein of the hyperbolic navigation signal transmitting stations. The output signals of the reference point setting circuit 3 are coupled to the other input of the longitude and latitude computation circuit 2 which computes based on the position signals from the electronic navigation receiver 1 and the longitude and latitude signals from the reference point setting circuit 3 to obtain the longitude and latitude of the ship's position. The longitude and latitude of a position of the ship are obtained by computing the distances between the ship's position and the positions of the transmitting stations. The signals representative of the longitude and latitude of the ship's position are supplied to one inputs of a first distance computation circuit 4, a reference position memory 5 and a first position memory 6. The longitude and latitude of the ship's position supplied to and stored in the first position memory 6 are replaced with new ones from the longitude and latitude computation circuit 2, each time an output signal is produced from a first distance judgement circuit 7. The first distance computation circuit 4 computes the distance moved from a point, the position signals of which are stored in the first position memory 6, each time the longitude and latitude signals are produced from the computation circuit 2. The distance moved by the ship is obtained by combining, in vector, a positional shift of the ship in a longitudinal direction and a positional shift of the ship in a latitudinal direction. The signals representative of the moved distance produced by the first distance computation circuit 4 are supplied to the input of the first distance judgement circuit 7 which produces an output signal when the ship has moved by a predetermined distance. The output signal from the distance judgement circuit 7 is supplied to the other input of the first position memory 6 to replace the longitude and latitude signals of the previous ship's position stored therein with new ones of the present ship's position. Then, the first distance computation circuit 4 will compute the distance advanced by the ship thereafter from the point corresponding to the latest position signals stored in the first position memory 6.

Figure 3:
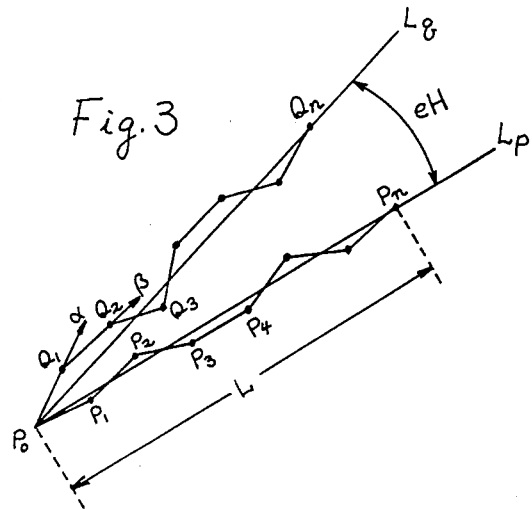
FIG. 3 shows a diagram for explaining the operation of a portion of the automatic pilot system shown in FIG. 2.

Referring to FIG. 3, it is now assumed that the ship starts to proceed at a point Po. When the ship has moved by a predetermined distance 1 to reach a point P1, a judgement signal is produced from the first distance judgement circuit 7, and hence the signals of the ship's previous position Po which have been stored in the first position memory 6 are replaced with the signals representative of the present ship's position P1. When the ship will have further moved from the point P1 to a point P2 by the predetermined distance 1, another judgement signal is produced from the distance judgement circuit 7 and supplied to the other input of the first position memory 6. In the same way, each time the ship travels by the predetermined distance 1 from a point P3 to a point Pn by way of points P4 through Pn, a judgement signal is produced by the distance judgement circuit 7 and supplied to the first position memory 6. The judgement signals from the first distance judgement circuit 7 are also supplied to one input of a position computation circuit 8. The signals representative of the moved distance of the ship are also supplied to another input of the position computation circuit 8 which are also supplied with signals representative of a specific direction of the ship, for example, the heading direction thereof produced by an azimuth detector 9 and with the position signals stored in a second position memory 10. The azimuth detector 9 may comprise a magnetic compass or a gyro compass. The second position memory 10 stores the signals representative of one of presumed present ship's positions Q1 through Qn, but stores those of the starting point Po at an initial stage and supplies the signals to the position computation circuit 8. The position computation circuit 8 computes to identify an imaginary present position Q of the ship based on the signals representative of the traveled distance 1 produced by the first distance computation circuit 4, azimuth information from the azimuth detector 9 and the position signals stored in the second position memory 10, as a judgement signal is supplied to the input thereof from the first distance judgement circuit 7. The position computation circuit 8 computes to determine a presumed present ship's position spaced by the distance 1 in an azimuth, for example $\alpha$ from the previous position, the signals of which have been stored in the second position memory 10. Assuming now, for instance, that the signals representative of the starting point Po are stored in the second position memory 10, an imaginary ship's present position Q1 is identified by the position computation circuit 8. The point Q1 is spaced by the distance 1 in the azimuth $\alpha$ from the point Po. The signals representative of the point Q1 are transmitted to and stored in the second position memory 10. When another judgement signal is produced from the first distance judgement circuit 7, the position computation circuit 8 computes to determine the next position Q2 with respect to the previous point Q1. The point Q2 is spaced from the point Q1 by the distance 1 in an azimuth $\alpha$ which is measured by the azimuth detector 9 when the ship is at the point P2. In the same way, as illustrated in FIG. 3, the signals representative of the previous position identified by the position computation circuit 8 and stored in the second position memory 10 are successively replaced with newer ones of the newly established positions Q2, Q3, Q4 . . . Qn, each time a judgement signal is produced from the first distance judgement circuit 7.

As apparant from the foregoing description, the signals relating to the previous ship's position stored in the first position memory 6 and the second position memory 10 are successively replaced with the signals relating to the present ship's position, each time a judgement signal is produced from the first distance judgement circuit 7. The position signals stored in the first position memory 6 are obtained by converting the output signals from the electronic navigation receiver 1 to longitude and latitude signals, and thus are representative of absolute positions on the surface of the earth. On the other hand, the position signals of the ship stored in the second position memory 10 are obtained by computation based on the traveled distance 1 and the azimuth information produced by the azimuth detector 9 and the previous computed position. The azimuth information obtained by the azimuth detector 9 is, for instance, the heading direction of the ship, and hence is not coincident with the moving direction of the ship. Thus, the signals stored in the second position memory 10 are representative of presumed positions of the ship. A presumed position, the signals representative of which being stored in the second position memory 10, is not always coincident with a corresponding absolute position measured by the electronic navigation receiver 1. This difference is caused by water current, wind directions and azimuth errors with the azimuth detector.

As the signals relating to the previous position of the ship stored in the first position memory 6 and the second position memory 10 are replaced with the position signals relating to the newly reached position of the ship, the signals representative of an absolute position stored in the first position memory 6 are supplied to one input of a straight line distance computation circuit 11, while the signals representative of the reference position Po being supplied to the other input thereof from the reference position memory 5. The straight line distance computation circuit 11 computes to obtain a straight line distance between the reference point Po and a position, the signals representative of which are stored in the first position memory 6. The resultant straight line distance is supplied to a second distance judgement circuit 12 which produces an output signal when the straight line exceeds the predetermined distance L. Assuming now, for instance, that the signals representative of the starting point Po as shown in FIG. 3 are stored in the refernce position memory 5 and the signals representing the present position Pn are stored in the first position memory 6, the straight line distance computation circuit 11 computes to obtain the straight line distance between the points Po and Pn. When the resultant straight line distance becomes equal to the predetermined distance L, the second distance judgement circuit 12 produces an output signal which is supplied to an error angle computation circuit 13. The error angle computation circuit 13 computes to produce an angle eH of intersection formed by a straight line Lp joining the starting point Po and the position Pn and another straight line Lq joining the point Po and the position Qn and intersecting the line Lp at the point Po, provided that the signals representative of the position Pn is stored in the first position memory 6 and the signals representative of the position Qn are stored in the second position memory 10. The angle eH is obtained, for example, in the following way. The error angle computation circuit 13 computes to produce an angle $\theta 1$ of intersection formed by the straight line Lp with respect to a reference line and an angle $\theta 2$ of intersection formed by the straight line Lq with respect to the reference line, and then performs a subtraction operation between the angles $\theta 1$ and $\theta 2$ to obtain the error angle eH. The output signal from the second distance judgement circuit 12 is also transmitted to the other input of the reference position memory 5 and to one input of the second position memory 10. When the output signal is produced from the second distance judgement circuit 12, the error angle computation circuit 13 produces an error angle eH, and the signals representative of the point Po stored in the reference position memory 5 and the signals representative of the point Qn stored in the second position memory 10 are replaced with the signals representative of the present absolute position Pn supplied from the longitude and latitude computation circuit 2. In the same manner as described above, the first distance computation circuit 4, the position computation circuit 8 and the straight line distance computation circuit 11 and the error angle computation circuit 13 will perform the computation operations with respect to the renewed starting position Pn to produce traveled distances, presumed positions, straight line distances and an error angle eH respectively.

The output signal represented as the deviation angle eH from the error angle computation circuit 13 is supplied to a correction circuit 14. The correction circuit 14 varies the heading direction of the ship measured by the azimuth detector 9 by an amount of the deviation angle eH to produce an output signal representative of a new heading direction H' to which the ship should be steered. The output of the correction circuit 14 is coupled to one input of a comparison circuit 15, the other input of which is coupled to the output of a course determination circuit 16. The comparison circuit 15 compares the output signal from the correction circuit 14 with signals representative of a course joining the reference point Pn and a destination point WP supplied from the course determination circuit 16 to produce a difference signal CA to a steering unit 17 which controls the advancing direction of the ship in a manner that the magnitude of the difference signal CA is reduced to zero. One input of the course determination circuit 16 is coupled to the output of the reference position memory 5, and the other input thereof is coupled to the output of a destination point setting unit 18 which applies the signals representative of a destination WP to the other input of the course determination circuit 16. The course determination circuit 16 determines a course line C(n−1) joining the point Po and the point WP, when the ship is at the starting point Po, and determines another course line joining the point Pn and the destination point WP, when the ship reaches the point Pn and the signals representative of the point Pn are written into the reference position memory 5 to replace the signals representative of the point Po.

Figure 4:
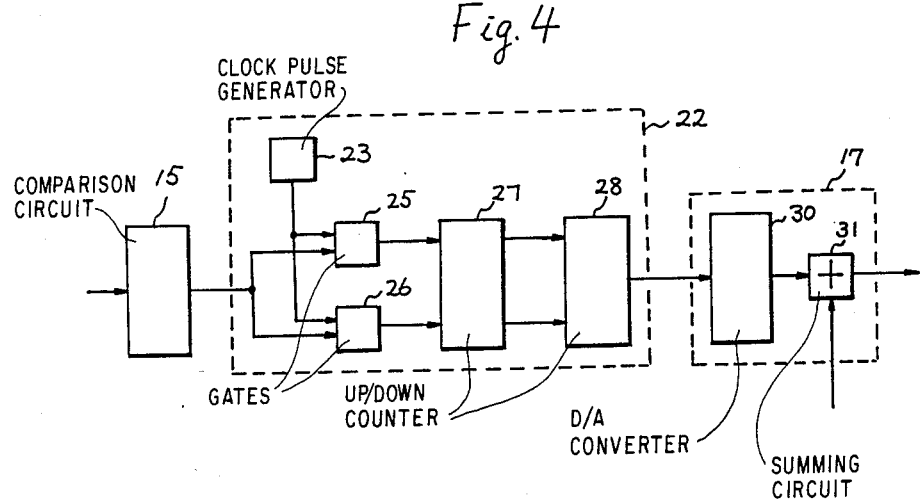
FIG. 4 shows a schematic block diagram of an embodiment of a portion of the automatic pilot system shown in FIG. 2.

The steering unit 17 comprises, for example, a digital-analog converter and a summing circuit, the output of which is coupled to the rudder. The steering unit 17 has two input terminals, one input of which coupled to the output of the comparison circuit 15, and the other of which coupled to the rudder. The output signal from the comparison circuit 15 is supplied to the input of the digital-analog converter. The output signal from the converter is applied to one input of the summing circuit. To the other input thereof is supplied the signal representative of the displacement of the rudder. The steering unit 17 drives the rudder based on the difference between the signals supplied from the comparison circuit 15 and from the rudder. The steering unit 17 operates in a well-known manner. Although, the output signal from the comparison circuit 15 is directly supplied to the steering unit 17 in the foregoing embodiment of the invention, a smoothing circuit 22 is perferably interposed between the output of the comparison circuit 15 and the input of the steering unit 17. Referring to FIG. 4, the smoothing circuit 22 comprises, for example, a clock pulse generator 23, gates 25 and 26, an up-down counter 27 and an up-down counter 28. The clockpulse generator 23 supplies a train of clock pulses to one inputs of the gates 25 and 26. While the amplitude of the output signals from the comparison circuit 15 are positive values, the gate 25 passes a train of clock pulses with a time period to an "up" input terminal of the up-down counter 27. In the case, the values of the output signals from the comparison circuit 15 are negative, the gate 26 applies a train of the clock pulses with the time period to a "down" input terminal of the counter 27. The up-down counter 27 increases its count values when the input pulses are applied at the "up" input terminal thereof, and decreases its count when the input pulses are supplied to the "down" input terminal thereof, and supplies a pulse to an "up" input terminal of the up-down counter 28 each time the count of the counter 27 reaches a predetermined positive count value, and applies a pulse to a "down" input terminal of the counter 28 each time the count of the counter 27 reaches a predetermined negative count value. The up-down counter 28 increases its count when an input pulse is applied at the "up" input terminal thereof, and decreases its count when an input pulse is supplied at the "down" input terminal thereof. The output signal from the smoohting circuit 22 is transmitted to the input of the digital-analog converter 30 in the steering unit 17. The analog output signal from the converter 30 is supplied to one input of the summing circuit 31 which produces difference signals between the signals supplied from the converter 30 and from the rudder.

Although, the output signal representative of the heading direction of the ship is directly transmitted to one input of the position computation circuit 8 in the foregoing embodiment of the invention, an averaging circuit 21 is preferably interposed between the output of the azimuth detector 9 and the one input of the position computation circuit 8. The averaging circuit 21 is operative in response to the output signals from the azimuth detector 9 to provide an output signal representative of an average compass heading for the predetermined traveled distance 1. Assuming now, for instance, that the signals representative of the starting point Po have been stored in the second position memory 10 and the ship has proceeded from the point Po to the point P1, a signal representative of an average compass heading α' is produced by the averaging circuit 21.

Although, the course determining circuit 16 determines a course line joining the present position Pn of the ship and the destination point WP in the foregoing embodiment according to the present invention, it is also possible to determine a course line joining the present position of the ship and a temporary destination point TP which is on the course line joining the start point Po and the destination ponint WP, as illustrated in FIG. 1. The distance between the temporary destination point TP and the destination point WP is preferably set the same as the distance between the present position Pn of the ship and the temporary destination point TP. In this case, the course determination circuit 16 determines a temporary destination point TP and the course line joining the present position Pn of the ship and the temporary destination point TP based on the signals representative of the start point Po and the present position Pn of the ship supplied from the reference position memory 5 and the signals representative of the destination point WP. This arrangement makes it possible to direct the ship to the destination point WP more smoothly compared with the foregoing embodiment of the invention.

While the invention has been described in detail and with reference to specific embodiments thereof, it will be apparant to one skilled in the art that various changes and modifications can be made therein without departing from the spirit and scope of invention.

What is claimed is:

1. An automatic pilot system for automatically directing a moving body to a destination point, comprising:
   (i) first means for providing a signal representative of a destination point;
   (ii) second means for determining a course line joining the present position of the moving body measured by an electronic navigation apparatus and the destination point and for producing a signal representative of the course line;
   (iii) third means for producing a signal representative of a specific direction of the moving body;
   (iv) fourth means for producing a signal representative of a difference angle of intersection formed by a first line joining the present position of the moving body and a past position thereof spaced by a first predetermined distance from the present position, with the past position being measured by the electronic navigation apparatus, and a second line joining said past position and a presumed point obtained based on the output signals from said electronic navigation apparatus and the output signals from said third means;
   (v) fifth means for adding the output signal from said fourth means to the output signal from said third means representative of the specific direction of the moving body at its present position;
   (vi) sixth means for producing the difference signal between the output signal from said second means and the output signal from said fifth means; and
   (vii) seventh means for steering the moving body based on the output signal from said sixth means.

2. An automatic pilot system as defined in claim 1 wherein the third means produces a signal representative of the heading direction of the moving body.

3. An automatic pilot system as defined in claim 1 further comprising smoothing means interposed between said sixth means and said seventh means.

4. An automatic pilot system as defined in claim 1 wherein the third means comprises a magnetic compass.

5. An automatic pilot system as defined in claim 1 wherein said second line is drawn straight between the past position and said presumed point which is determined by sequentially determining previous presumed points, a number of times, each spaced by a second predetermined distance from the previous presumed point at an azimuth measured by the third means at a present position of the moving body corresponding to the respective presumed point.

6. An automatic pilot system for automatically directing a moving body to a destination point, comprising:
   (i) first means for producing a signal representative of a position of a moving body;
   (ii) second means for providing a signal representative of a first destination point;
   (iii) third means for providing a signal representative of a second destination point based on the signal representative of a start point of the moving body supplied from said first means, the signal representative of the first destination point from said second means and the signal representative of the present position of the moving body from said first means;
   (iv) fourth means for determining a course line joining the present position of the moving body and the second destination point and for producing a signal representative of the course line;
   (v) fifth means for producing a signal representative of a specific direction of the moving body;
   (vi) sixth means for producing a signal representative of a difference angle of intersection formed by a first line joining the previous position and the present position of the moving body measured by means for measuring the position of the moving body, and a second line joining said previous position and a presumed point obtained based on the output signals from said position measuring means and the output signals from said fifth means;

(vii) seventh means for summing the output signal from said sixth means and the output signal from said fifth means representative of the specific direction of the moving body at its present position;

(viii) eighth means for producing a difference signal between the output signal from said fourth means and the output signal from said seventh means; and (ix) ninth means for steering the moving body based on the output signal from said eighth means.

7. An automatic pilot system as defined in claim 6 further comprising smoothing means interposed between said eighth means and said ninth means.

8. An automatic pilot system as defined in claim 1 wherein said second line is drawn straight between the previous position and said presumed point which is at the same distances from a previous presumed position as between adjacent two points of a plurality of points of the moving body measured by the position measuring means between the previous position and the present position, and by the signals from said fifth means representative of the azimuths at corresponding points of the plurality of points of the moving body.

9. An apparatus for providing a course signal, comprising:

(i) first means for providing a signal representative of a destination point;

(ii) second means for determining a course line joining the present position of the moving body measured by an electronic navigation apparatus and the destination point and for producing a signal representative of the course line;

(iii) third means for producing a signal representative of a specific direction of the moving body;

(iv) fourth means for producing a signal representative of a difference angle of intersection formed by a first line joining the present position of the moving body and a past position thereof spaced by a first predetermined distance from the present position, with the past position being measured by the electronic navigation apparatus, and a second line joining said past position and a presumed point obtained based on the output signals from said electronic navigation apparatus and the output signals from said third means; and (v) fifth means for adding the output signal from said fourth means to the output signal from said third means representative of the specific direction of the moving body at its present position.

10. An apparatus for providing a course signal comprising:

(i) first means for producing a signal representative of a position of the moving body;

(ii) second means for providing a signal representative of a first destination point;

(iii) third means for providing a signal representative of a second destination point based on the signal representative of a start point of the moving body supplied from said first means, the signal representative of the first destination point from said second means and the signal representative of the present position of the moving body from said first means;

(iv) fourth means for determining a course line joining the present position of the moving body and the second destination point and for producing a signal representative of the course line;

(v) fifth means for producing a signal representative of a specific direction of the moving body;

(vi) sixth means for producing a signal representative of a difference angle of intersection formed by a first line joining the previous position and the present position of the moving body measured by means for measuring the position of the moving body, and a second line joining said previous position and a presumed point obtained based on the output signals from said position measuring means and the output signals from said fifth means; and (vii) seventh means for summing the output signal from said sixth means and the output signal from said fifth means representative of the specific direction of the moving body at its present position.

11. An automatic pilot system for automatically directing a moving body to a destination point, comprising:

(i) first means for producing a signal representative of a position of the moving body;

(ii) second means for providing a signal representative of a first destination point;

(iii) third means for providing a signal representative of a second destination point based on the signal representative of a start point of the moving body supplied from said first means, the signal representative of the first destination point from said second means and the signal representative of the present position of the moving body from said first means;

(iv) fourth means for determining a course line joining the present position of the moving body and the second destination point and for producing a signal representative of the course line;

(v) fifth means for producing a signal representative of a specific direction of the moving body;

(vi) sixth means for producing a signal representative of a difference angle of intersection formed by a first line joining the present position of the moving body and a past position thereof spaced by a first distance from the present position, with the past position being measured by means for measuring the position of the moving body, and a second line joining said past position and a presumed point obtained based on the output signals from said position measuring means and the output signals from said fifth means;

(vii) seventh means for summing the output signal from said sixth means and the output signal from said fifth means representative of the specific direction of the moving body at its present position;

(viii) eigth means for producing a difference signal between the output signal from said fourth means and the output signal from said seventh means; and (ix) ninth means for steering the moving body based on the output signal from said eighth means.

12. An automatic pilot system as defined in claim 11 wherein said second line is drawn straight between the past position and said presumed point which is determined by sequentially determining previous presumed points, a number of times, each spaced by a second predetermined distance from the previous presumed point at an azimuth measured by the fifth means at a present position of the moving body corresponding to the respective presumed point.

* * * * *